(12) United States Patent
Hori

(10) Patent No.: US 8,391,595 B2
(45) Date of Patent: Mar. 5, 2013

(54) IMAGE PROCESSING METHOD AND IMAGE PROCESSING APPARATUS

(75) Inventor: Shinjiro Hori, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1228 days.

(21) Appl. No.: 11/754,161

(22) Filed: May 25, 2007

(65) Prior Publication Data
US 2007/0274573 A1 Nov. 29, 2007

(30) Foreign Application Priority Data
May 26, 2006 (JP) .................................. 2006-147350

(51) Int. Cl.
*G06K 9/00* (2006.01)

(52) U.S. Cl. ...................... 382/165; 382/162; 382/167

(58) Field of Classification Search .................. None
See application file for complete search history.

(56) References Cited

U.S. PATENT DOCUMENTS

| | | | |
|---|---|---|---|
| 5,218,387 A | 6/1993 | Ueno et al. | |
| 5,684,509 A * | 11/1997 | Hatanaka et al. | 345/615 |
| 5,870,100 A * | 2/1999 | DeFreitas | 345/441 |
| 5,912,994 A * | 6/1999 | Norton et al. | 382/283 |
| 5,990,973 A * | 11/1999 | Sakamoto | 348/576 |
| 6,252,976 B1 * | 6/2001 | Schildkraut et al. | 382/117 |
| 6,711,286 B1 * | 3/2004 | Chen et al. | 382/162 |
| 6,885,760 B2 | 4/2005 | Yamada et al. | |
| 6,895,103 B2 | 5/2005 | Chen et al. | |
| 6,965,684 B2 | 11/2005 | Chen et al. | |
| 7,024,035 B1 * | 4/2006 | Enomoto | 382/167 |
| 7,103,218 B2 | 9/2006 | Chen et al. | |
| 2001/0036298 A1 * | 11/2001 | Yamada et al. | 382/118 |
| 2002/0126893 A1 * | 9/2002 | Held et al. | 382/167 |
| 2003/0179911 A1 * | 9/2003 | Ho et al. | 382/118 |
| 2004/0037460 A1 * | 2/2004 | Luo et al. | 382/165 |
| 2007/0041640 A1 | 2/2007 | Tabata et al. | |

FOREIGN PATENT DOCUMENTS

| | | |
|---|---|---|
| JP | 5-197793 A | 8/1993 |
| JP | 6-121332 A | 4/1994 |
| JP | 8-063597 A | 3/1996 |
| JP | 8-077334 A | 3/1996 |
| JP | 2541688 B | 10/1996 |
| JP | 11-053525 A | 2/1999 |
| JP | 11-146405 A | 5/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-044469 A | 2/2002 |
| JP | 2002-183731 A | 6/2002 |
| JP | 2003-006645 A | 1/2003 |
| JP | 2003-030667 A | 1/2003 |
| JP | 2004-303193 A | 10/2004 |
| JP | 2006-039670 A | 2/2006 |
| JP | 2006-072743 A | 3/2006 |
| JP | 2006-133875 A | 5/2006 |

* cited by examiner

*Primary Examiner* — Li Liu

(74) *Attorney, Agent, or Firm* — Canon USA Inc. IP Division

(57) ABSTRACT

In order to accurately determine a face area when performing image correction of an image, a pixel is set as a start point in the face area, then, pixels in which skin color is continuous from the start point are searched, and pixels that have been searched are linked to generate a skin color mask for the image. At the same time, an ellipse mask is generated for an ellipse area that includes the face area and is weighted according to distance from a center thereof, and which is composed with the skin color mask to generate a composition mask indicating the correction area.

27 Claims, 17 Drawing Sheets

$D = \max(W, H)$

D=max(W, H)

D=max(W, H)

IMAGE PROCESSING METHOD AND IMAGE PROCESSING APPARATUS

BACKGROUND OF THE INVENTION

1. Field of the Invention

The present invention relates to an image processing method and an image processing apparatus, and particularly relates to an image processing method and an image processing apparatus in which a face area of a person in a pictorial image is detected and a correction is performed thereupon.

2. Description of the Related Art

Due to the spread of digital cameras and improvements in the capabilities of printers in recent years, there are increasing opportunities for ordinary users to print out in their own homes images they have captured. However, users who print out captured images as they are have been unable to obtain picture quality equivalent to that of a development, printing, and enlargement, or DPE, service, or an online print service that is provided by a professional business. The reason is that, with DPE and online print services, printing is carried out after executing appropriate corrections on the images captured by the user.

A particularly common target for corrections in captured images is persons in the images, and corrections are performed so that persons in the images are reproduced in fine detail. For example, backlight correction is carried out if an image is captured against a backlight, and corrections are carried out to achieve favorable skin colors for persons.

Such correction results can also be obtained by using commercially available applications. Commercially available applications include those that offer correction functions spanning a wide range of elements, including brightness, contrast, hue, saturation, etc. By combining and executing these correction items, corrections equivalent to those carried out by DPE and online print services can be achieved. However, it is difficult for an ordinary user to carry out complicated correction tasks such as these.

Consequently, methods have been proposed for automatically carrying out corrections related to image correction that gives importance to the persons in the images.

For example, techniques are known in which a skin color area or a face area of a person is detected from image signals, and luminance correction, color correction, and aperture correction are carried out on only the detected areas, for example see Japanese Patent Laid-Open Nos. H6-121332 and H11-146405. With these techniques, area extraction is carried out using skin color detection in order to adjudicate face detection and areas to be corrected.

Furthermore, color correction techniques are known in which digital image data, as photo images including human faces and skin areas, undergoes color correction so that the colors of human faces and skin areas are corrected to natural colors, and good color balance is achieved for the entire image as well, for example, see Japanese Patent Laid-Open No. 2002-044469.

Further still, methods are known in which face areas in an image are detected and color components of skin from the face areas are specified so that correction is carried out limited to only these face areas, and corrections are carried out on only those color components, for example, see Japanese Patent Laid-Open No. 2004-303193.

However, these conventional automatic correction techniques for persons in images have the following problems.

In methods in which skin color areas are detected, as in Japanese Patent Laid-Open Nos. H6-121332 and H11-146405, defining human skin colors has been difficult. In particular, there have been problems in that detection is not possible when there is a color cast in the image to be corrected or when there are skin color portions in the background that are also detected and undergo correction. Furthermore, with face areas, there are drastic changes in color, mainly in luminance, due to shadows and the like, and it has been difficult to uniformly specify skin colors of entire faces.

Furthermore, in methods in which the color balance of the entire image is obtained, such as that described in Japanese Patent Laid-Open No. 2002-044469, there has been a problem in that corrections limited to face areas cannot be carried out since the colors of the entire image undergo corrections.

Furthermore, in methods in which corrections limited to only face areas are carried out, such as that described in Japanese Patent Laid-Open No. 2004-303193, there has been a problem in that corrections extend to background areas as well, when the background in the vicinity of the face resembles the skin color determined from the face area.

Also, some commercially available applications are provided with a function that can automatically specify areas. With such applications, an area to be corrected is typically extended from a point specified by the user, subject to a condition that either the color components are the same, or the difference in the color components is within a predetermined range. However, since faces are not flat surfaces, there are areas in which comparatively drastic color variations occur within the captured images. Consequently, the methods for specifying areas to be corrected cannot accurately specify the range of face areas alone, unless the differences in color components as a condition are made small, and a large number of points are specified.

SUMMARY OF THE INVENTION

An exemplary embodiment of the present invention is provided which makes it easy to set an appropriate correction range for face areas in an image in order to execute image correction.

A method for processing an image according to an exemplary embodiment of the present invention includes deciding a correction area in the image by searching for pixels in which skin color is continuous with setting a certain pixel in the face area as a start point, and executing image correction processing on the decided correction area.

An image processing apparatus according to an exemplary embodiment of the present invention includes a correction area decision unit configured to decide a correction area in the image by searching for pixels in which skin color is continuous setting a certain pixel in the face area as a start point, and a correction unit configured to execute image correction processing on the decided correction area.

Further features of the present invention will become apparent from the following description of exemplary embodiments (with reference to the attached drawings).

BRIEF DESCRIPTION OF THE DRAWINGS

The accompanying drawings, which are incorporated in, and constitute a part of, the specification, illustrate embodiments of the invention and, together with the description, serve to explain the principles of the invention.

DESCRIPTION OF THE EMBODIMENTS

The present invention is described in detail below based on exemplary embodiments thereof with reference to the accompanying drawings. It should be noted that any configuration shown in the following embodiments is merely an example, and the present invention is not limited to configurations shown in the diagrams.

The processing described in an exemplary embodiment of the present invention is achieved mainly by printer driver software in a computer that generates image information for output to a printer engine. Furthermore, it would also be permissible to internally install the processing a driver software or an application software for running an optical reading apparatus, such as a scanner or the like. Further still, it would also be permissible to internally install the processing as hardware or software in a copier, a facsimile machine, a printer main unit or the like.

Figure 1:
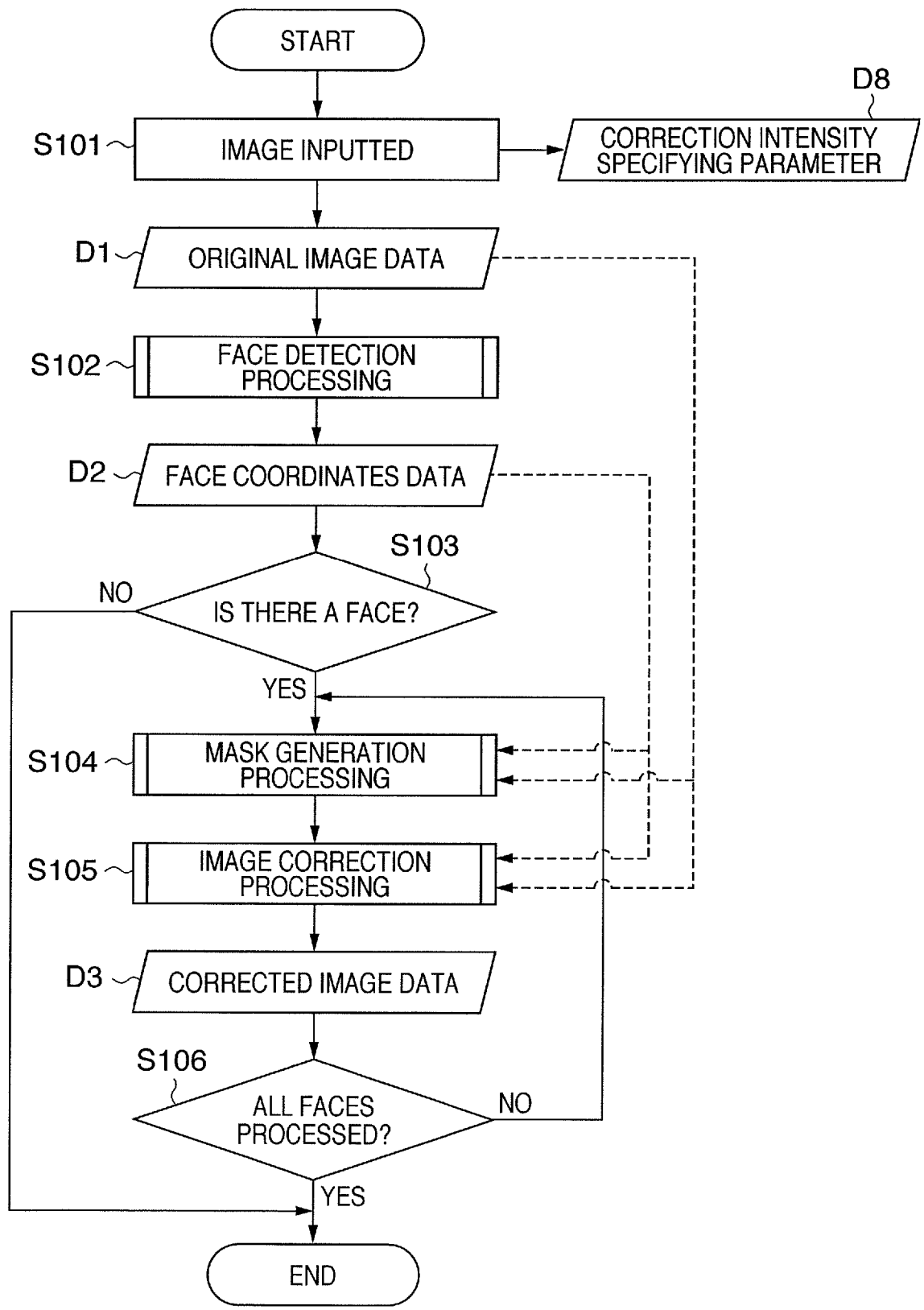
FIG. 1 is a flowchart illustrating an image correction process according to an exemplary embodiment of the present invention.

Following is a description of an outline of a correction process according to the exemplary embodiment. FIG. 1 is a flowchart illustrating an image correction process according to the present embodiment. In the diagram, a step number prefixed with "S" is attached in relation to processes, and a data number prefixed with "D" is attached in relation to data.

First, in step S101, an image targeted for processing is inputted. The image inputted in the present embodiment has been selected by a user within an application (not shown) that supports the present embodiment. The selected image is converted to a data format for internal processing. Image data captured by a digital camera or the like is generally compressed in a JPEG format. Accordingly, the data that is compressed in a JPEG format is decoded and original image data D1 is generated. It should be noted that the image data format targeted for processing in the present embodiment is not limited to JPEG, and other image formats, such as BMP and TIFF, or Tagged Image File Format, can also be supported.

According to the present embodiment, a correction intensity can be specified for the input image at the time of image input. The value specified herein is stored as a correction intensity specifying parameter D8, and referenced during correction.

In step S102, face detection processing is executed on the original image data D1 and a result thereof is stored as face coordinates data D2. The face detection process and the face coordinates data D2 are described in detail below.

In step S103, a determination is made whether a face area has been detected in the original image data D1. If no face area has been detected, the processing finishes. If a face area has been detected, the procedure proceeds to step S104 and mask data, a composition mask D7 (described below with respect to FIG. 3), is generated in order to adjudicate an area in which correction is to be carried out on the detected face area.

In step S105, image correction processing is executed based on the mask data generated in step S104 to generate corrected image data D3, which is then stored in a memory (not shown).

In step S106, a determination is made whether correction processing has been carried out on all face areas. If there is any face area that has not yet been corrected, the procedure proceeds to step S104 and the mask generation processing and the image correction processing of steps S104 and S105 are executed repeatedly until correction on all face areas has been completed.

The following is a detailed description of the face detection processing performed in step S102. Face detection processing is carried out on the original image data D1, with the detection targets thereof being positions of faces or the organs, i.e., eyes, nose, mouth, contours, etc., that constitute a face. There are currently a number of know methods for performing this detection.

For example, in Japanese Patent Laid-Open No. 2002-183731, an eye area is first detected within the input image, and a vicinity thereof is set as a face candidate area. A luminance gradient of each pixel and a weighting of luminance gradients are then calculated with respect to the face candidate area. When the values are compared against the luminance gradients and the weighting of luminance gradients of a predetermined ideal face reference image, the input image is determined to have a face area when an average angle between each luminance gradient is less than or equal to a predetermined threshold.

Also, according to Japanese Patent Laid-Open No. 2003-30667, it is possible to detect an eye position by first detecting a skin color area from the image, and then detecting for human iris color pixels in the skin color area.

According to Japanese Patent Laid-Open No. 8-63597, a degree of coincidence is calculated between a plurality of templates, each having a shape of a human face and an image. The template with the highest coincidence degree is selected, and the area within the selected template is treated as a face candidate area if the degree of coincidence is greater than or equal to a predetermined threshold. It is thus possible to detect the eye positions by using the same template.

According to Japanese Patent Laid-Open No. 2000-105829, nose image patterns are first set as templates, and the entire image, or a specified area within the image, is scanned, and the position with the best match is output as the nose position. Next, the area upward from the position of the nose in the image is deemed to be an area in which eyes are present, and eye image patterns are set as templates such that matching is carried out by scanning areas in which eyes are present, thereby obtaining a set of candidate positions for the presence of eyes, which is a set of pixels whose degree of coincidence exceeds a certain threshold. Additionally, continuous areas containing sets of candidate positions for the presence of eyes are divided off as clusters and the distance between each cluster and nose position is calculated. Accordingly, organ positions can be detected by determining that the cluster having the shortest distance there between is a cluster in which eyes are present.

Several other techniques are known for detecting face and organ positions. For example, Japanese Patent Laid-Open Nos. 8-77334, 2001-216515, 5-197793, 11-53525, 2000-132688, 2000-235648, 11-250267, and Japanese Patent No. 2541688 have been proposed. Any of the above-described techniques or any other technique that would enable practice of the present invention may be used in order to implement the present embodiment.

When the coordinates of a face area of a person in the original image data are obtained, the results are stored as face coordinates data D2, according to the present embodiment. While the face coordinates data D2 in the present embodiment are defined by coordinates of four vertices of a rectangular area indicating a face area, any configuration that would enable practice of the present invention is applicable.

Figure 2:
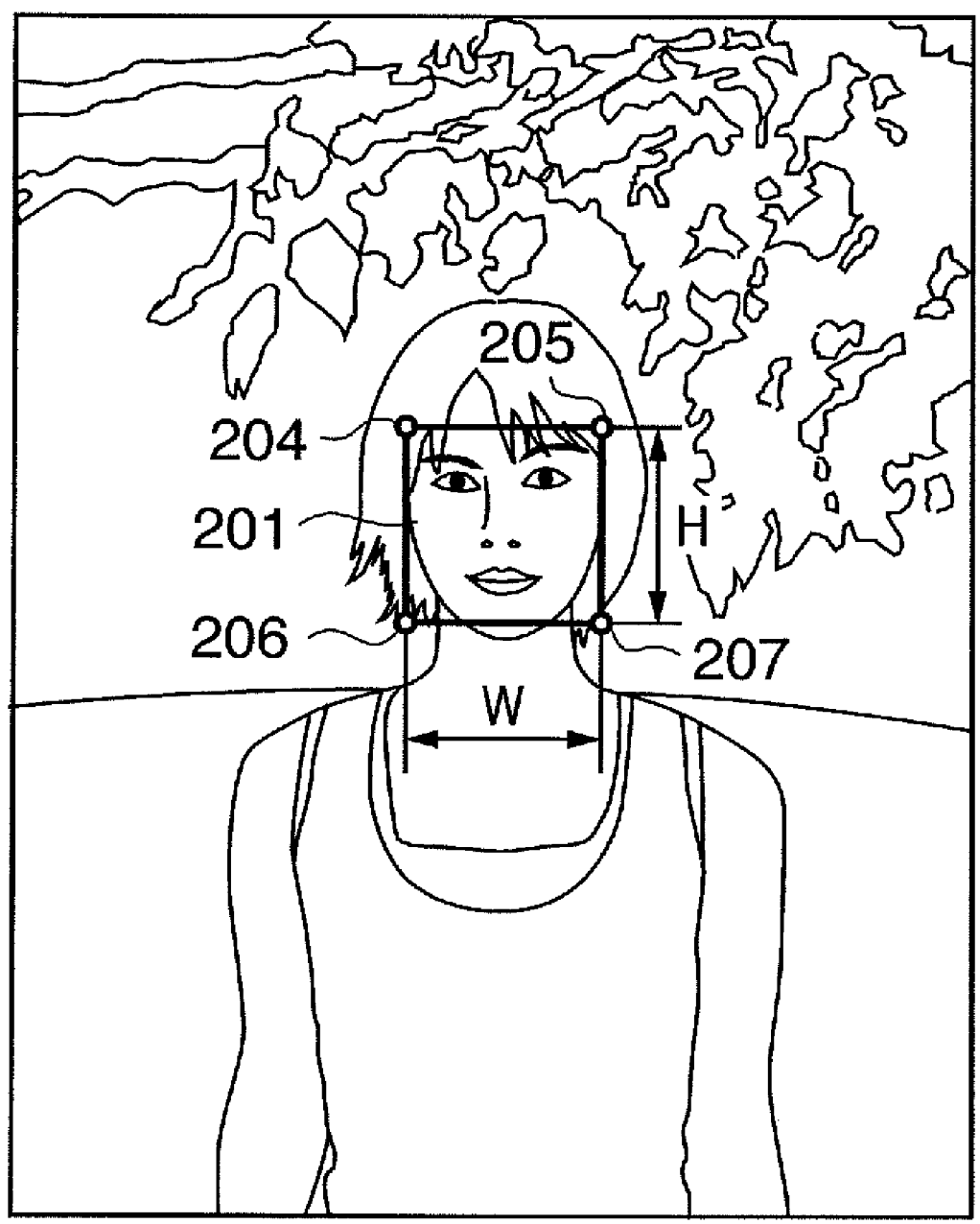
FIG. 2 shows one example of a face detection process according to the exemplary embodiment.

FIG. 2 illustrates an example of face detection processing according to the present embodiment. In FIG. 2, there is a human face close to a center of the image, and a face area 201 thereof is indicated as a rectangular area. The face area 201 is indicated by coordinates of four points 204, 205, 206, and 207, which indicate an upper left, upper right, lower left, and lower right of the rectangular area, respectively. Hereinafter, the coordinates are given as (x1, y1), (x2, y2), (x3, y3), and (x4, y4), respectively.

The coordinates of the image in FIG. 2 use the upper left as an origin, with an X axis on a horizontal direction, and a Y axis on a vertical direction. Consequently, a width W and a height H of the face area can be calculated by the following formula:

$$W = \sqrt{(x2-x1)^2 + (y2-y1)^2}$$

$$H = \sqrt{(x3-x1)^2 + (y3-y1)^2}$$

A plurality of face areas may be detected in a single set of image data using this face detection processing. According to the present embodiment, all of the face detection results are stored as face coordinates data D2. It should be noted that although no specific example is illustrated concerning organ detection processing, it is possible to store aside coordinates indicating organs such as eyes, mouths, and noses, to be used later.

The following is a description of the mask generation processing of step S104.

Figure 3:
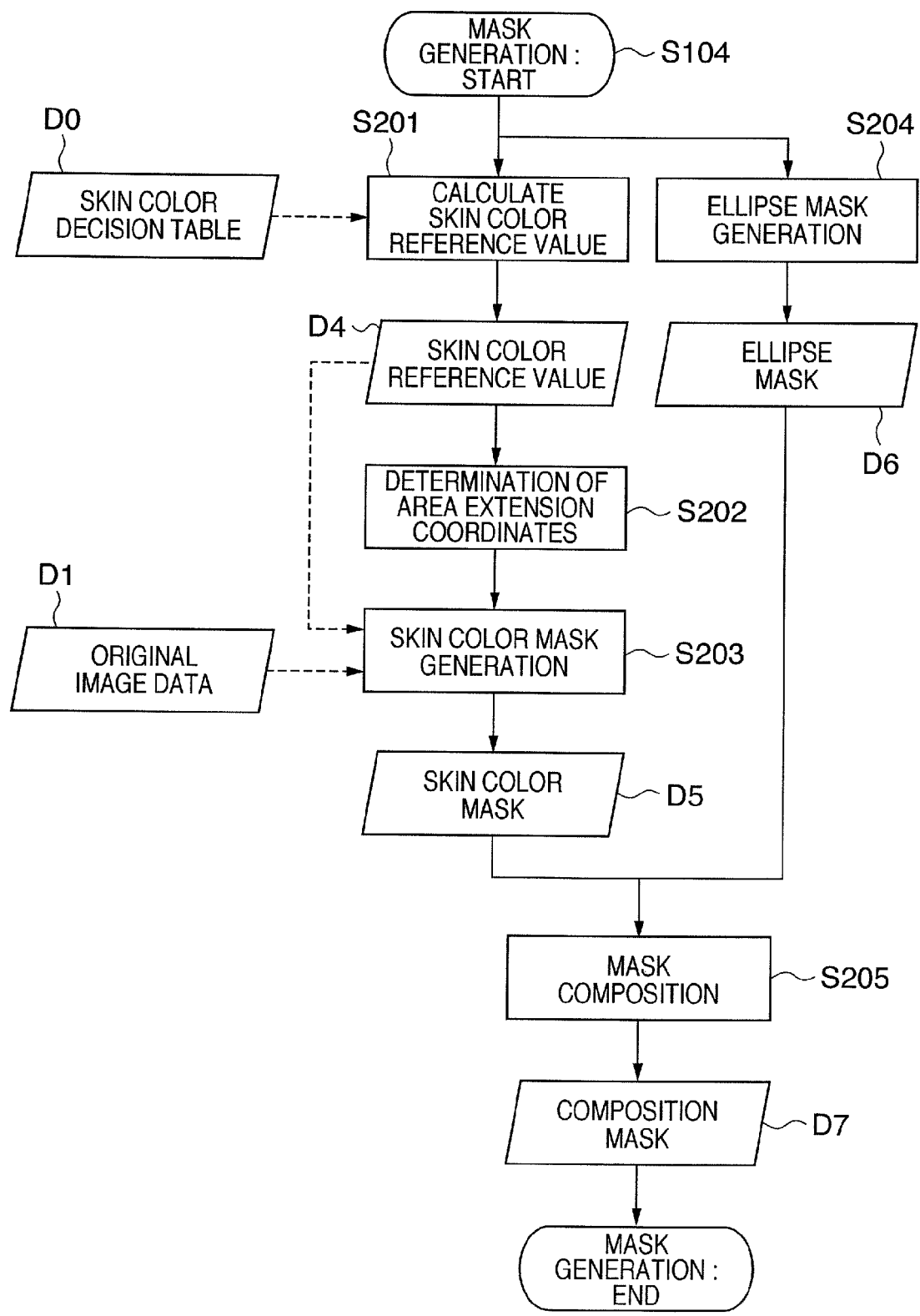
FIG. 3 is a flowchart illustrating a mask generation process according to the exemplary embodiment.

When a face area is detected from the original image data in step S102, a mask generation processing is carried out. FIG. 3 is a flowchart illustrating a mask generation process according to the present embodiment. As indicated in the flowchart, mask generation processing according to the present embodiment is divided into skin color mask generation processing, ellipse mask generation processing, and mask composition processing, in which the generated masks are composed. A description of each of these processes is provided below.

A skin color decision table D0 used in the skin color mask generation processes is prepared in advance. To generate the skin color decision table D0, first, a database of images in which human faces are captured is prepared. At this time, the image database is constructed to have a multitude of conditions related to humans, such as race, sex, and age, and conditions related to image capture, such as lighting and angle of view.

Image data is generated in which only skin portions of faces in the image database are collected and the color space is converted to hue, intensity, and saturation, or HIS, color space, and distributions of luminance, hue, and saturation in the skin areas are examined. The skin color decision table D0 is generated by storing the distributions of coordinates, in which the luminance, hue, and saturation of human skin are present, in a table format.

Figure 4:
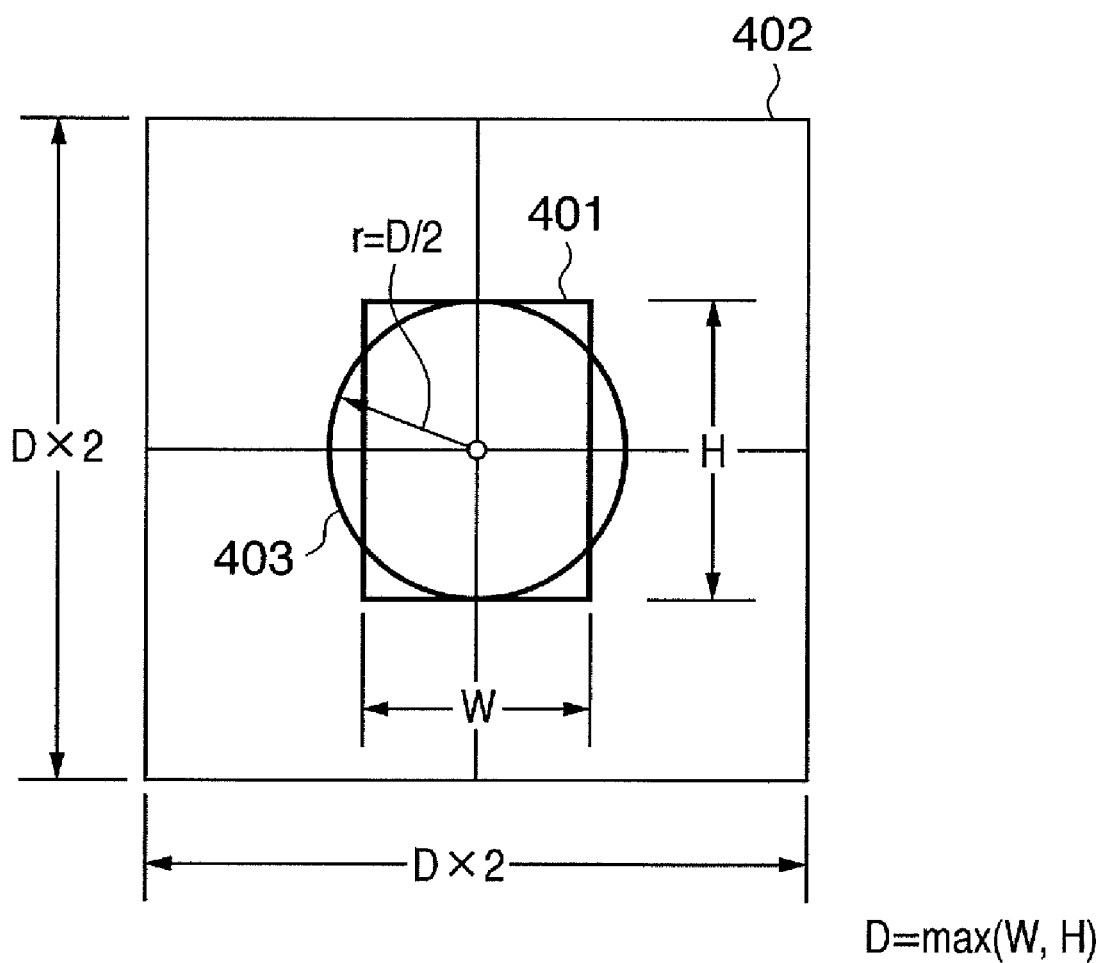
FIG. 4 illustrates a relationship between a face detection result and a processing area according to the exemplary embodiment.

As part of the skin color mask generation processing, a skin color reference value D4 is calculated in step S201. The skin color reference value D4 involves data that indicates distributions of color components in detected face areas. FIG. 4 illustrates a method for calculating the skin color reference value D4.

In FIG. 4, a rectangular face area 401 is detected, and the width and height thereof are given as W and H respectively. In the present example, the larger of W and H is defined as D, and an area of a square having sides 2×D arranged concentrically to the face area 401 is set as a processing area 402 to be processed later. Moreover, a circular area 403 is set having a radius r=D/2, using a center point of the face area 401 as a reference.

Figure 5:
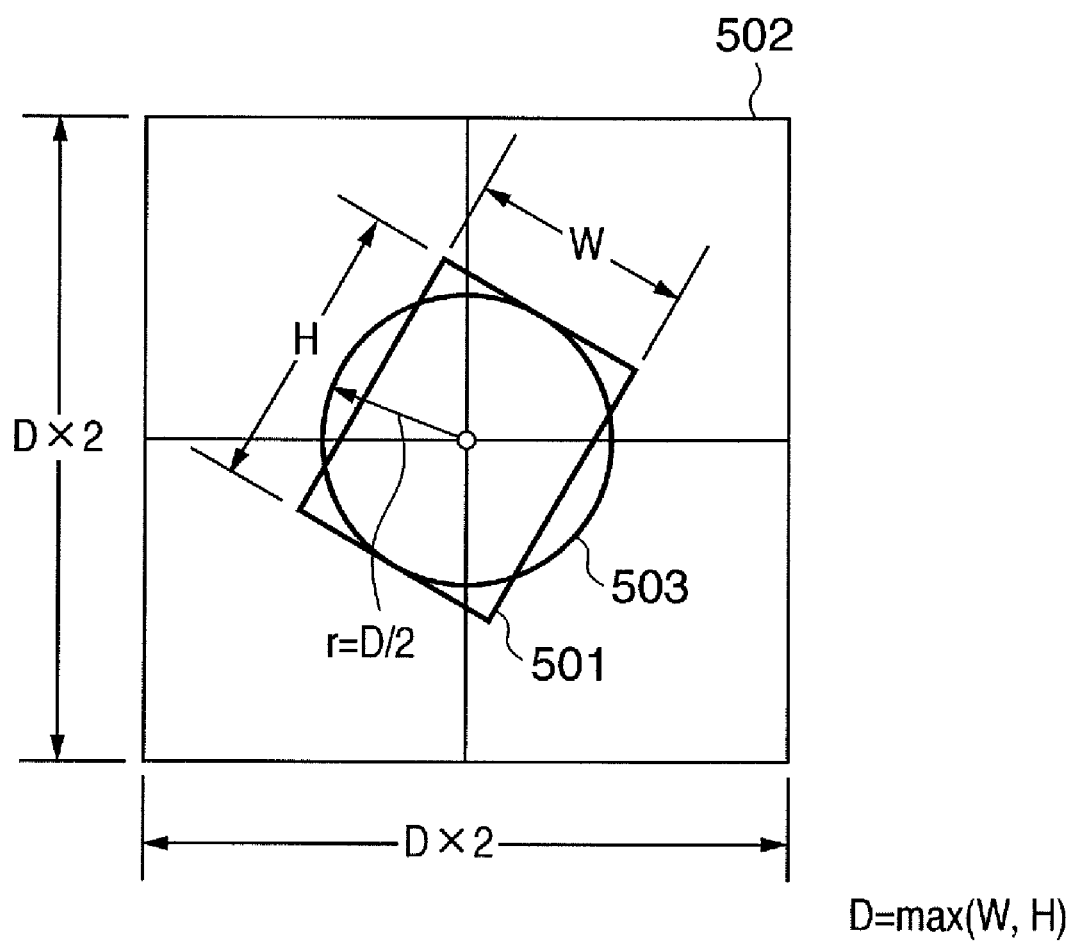
FIG. 5 illustrates a relationship between a face detection result and a processing area according to the exemplary embodiment.

It should be noted that FIG. 4 illustrates an example of the face area 401 that does not have an inclination, while FIG. 5 illustrates an example of a face area 501 that has an inclination. According to the present embodiment, in order to simplify calculation when the face area has an inclination as in FIG. 5, a processing area 502 is set to not have an inclination, and a circular area 503 is set using a same method as in FIG. 4.

Pixels in the circular area 403 illustrated in FIG. 4 are compared against the skin color determination table D0 to calculate average values of pixels determined to indicate skin color, and the resulting average values are stored as the skin color reference values D4. The skin color reference values D4 are calculated for R (Red), G (Green), B (Blue), H (Hue), S (Saturation), and I (Intensity) components, respectively.

When average values of the entire circular area 403 are used herein as they are as the skin color reference values D4, inappropriate processing results may be incurred in determining the skin color area and in image correction processing. The problem is due to areas in which color changes slightly, and areas in which color varies drastically, because of the influence of shadows and the like being mixed together in the face area 401. Consequently, in order to reflect variation of color in the face area according to the present embodiment, the circular area 403 is divided into a plurality of areas, and skin color reference values D4 that reflect the color changes are calculated by calculating the average values therein.

Figure 6:
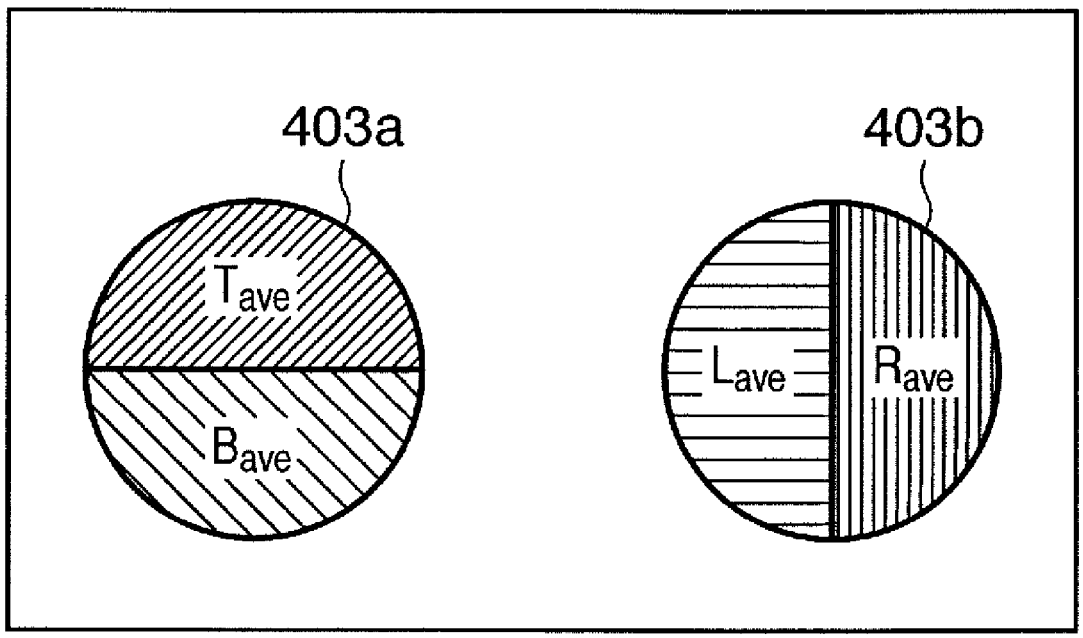
FIG. 6 illustrates an example of dividing face areas when calculating skin color reference values according to the exemplary embodiment.
Figure 7:
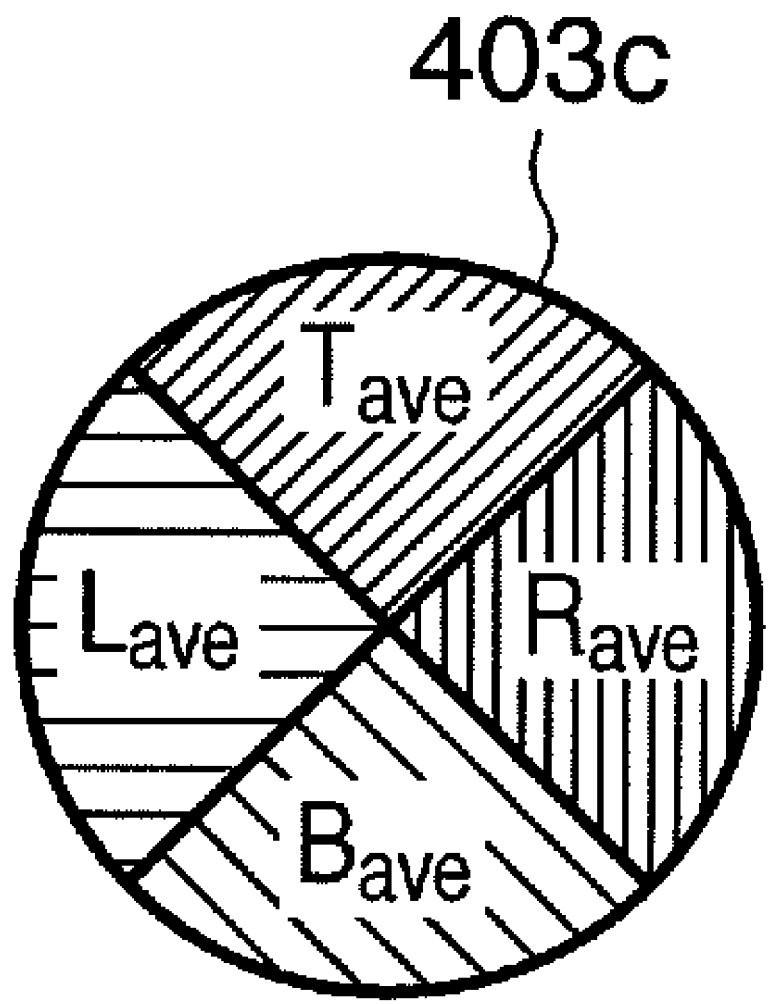
FIG. 7 illustrates an example of dividing face areas when calculating skin color reference values according to the exemplary embodiment.

A description of a method for calculating the skin color reference values D4 that reflect color variation in the circular area 403 will now be described. For example, as illustrated in FIG. 6, the circular area 403 is divided into top-bottom (403a) and left-right (403b) semicircles, and average values of these are given as Tave, Bave, Lave, and Rave respectively. It should be noted that the method for dividing the circular area 403 is not limited to the example illustrated in FIG. 6. For example, the division may be carried out into 90-degree sector regions centered on the top-bottom-left-right (403*c*), as illustrated in FIG. 7.

Figure 8:
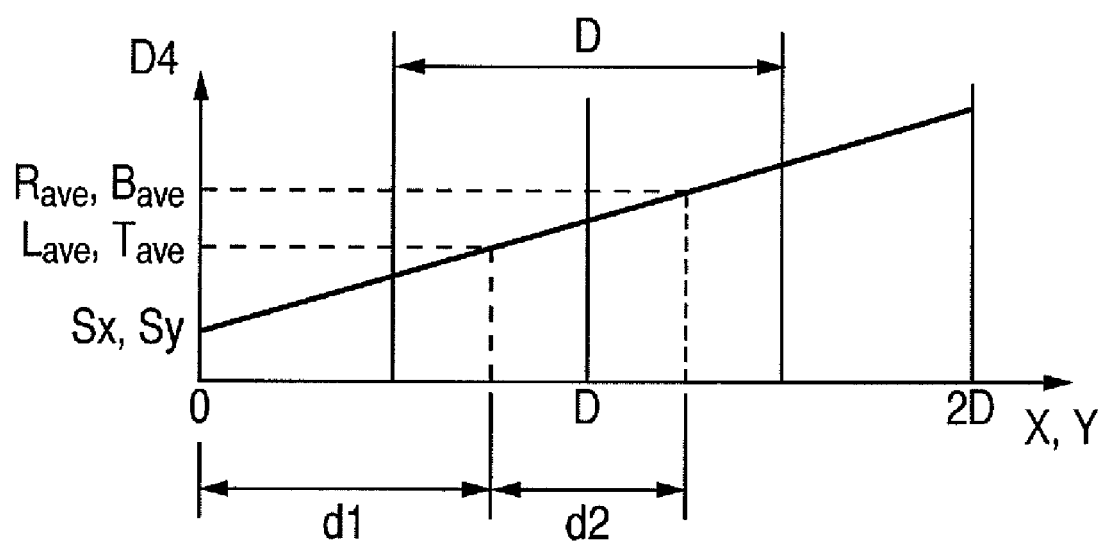
FIG. 8 is a diagram describing an algorithm for calculating skin color reference values according to the exemplary embodiment.

FIG. 8 is a diagram describing a method for calculating the skin color reference values D4 from the average values Tave, Bave, Lave, and Rave, of the four areas divided in the circular area 403. In the diagram, the horizontal axis illustrates the X or Y axis of the image, and the vertical axis shows the values of the skin color reference values D4. Furthermore, the horizontal axis of FIG. 8 corresponds to the processing area 402 of FIG. 4, as viewed from the X axis direction and the Y axis direction.

The following is a description concerning only the X axis direction, wherein the average value Lave of the left semicircle and the average value Rave of the right semicircle of the circular area 403 are respectively set at distances p times a diameter D from the center of the circular area 403, that is, at a distance of p×D. Thus, d1, which indicates a distance from the origin on the X axis in FIG. 8 to the Lave coordinates, and d2, which indicates a distance between the Lave coordinates and the Rave coordinates, are defined as follows:

Given $0 \leq x < 2D$, $0 \leq y < 2D$, $0 \leq p \leq 0.5$, $$d1 = (1-p) \times D, \quad d2 = D \times p \quad (1)$$

It should be noted that p in the above formula is a predetermined value and can be specified arbitrarily, and the specification thereof may be such that d1 is a distance to centroid coordinates of the semicircles illustrated in FIG. 6 or the sector regions illustrated in FIG. 7.

The values of the skin color reference values D4 of x=d1, x=d1+d2 in the X axis direction are Lave and Rave, respectively, and the values of the skin color reference values D4 of y=d1, y=d1+d2 in the Y axis direction are Tave and Bave, respectively. Accordingly, sections Sx and Sy illustrated in FIG. 8 are expressed by the following formulas, respectively:

$$Sx = \text{Lave} - (\text{Rave} - \text{Lave}) \times (d1/d2) \quad (2)$$

$$Sy = \text{Tave} - (\text{Bave} - \text{Tave}) \times (d1/d2) \quad (3)$$

As a result, the skin color reference values D4 for the coordinates (x, y) in the processing area 402 are defined by the following formula giving consideration to color variation in the aforementioned divided areas. That is, an average of the skin color reference values giving consideration to color variation in the X axis direction, and the skin color reference values giving consideration to color variation in the Y axis direction, is obtained:

$$\text{Skin color reference value}(x, y) = \frac{S_x + \frac{R_{ave} - L_{ave}}{d_2} \times x + S_y + \frac{B_{ave} - T_{ave}}{d_2} \times y}{2} \quad \text{(Numerical expression 1)}$$

According to the present embodiment, skin color areas are detected in the processing area in order to generate skin color masks for the processing area. Accordingly, when the skin color reference values D4 are calculated in step S201, coordinates of a start point of area extension are determined in step S202 in order to generate skin color masks. The start point determined herein is, in other words, a pixel that expresses a reference skin color in the processing area, and by extending the skin color area from this start point, a skin color mask of an appropriate size can be generated.

Figure 9:
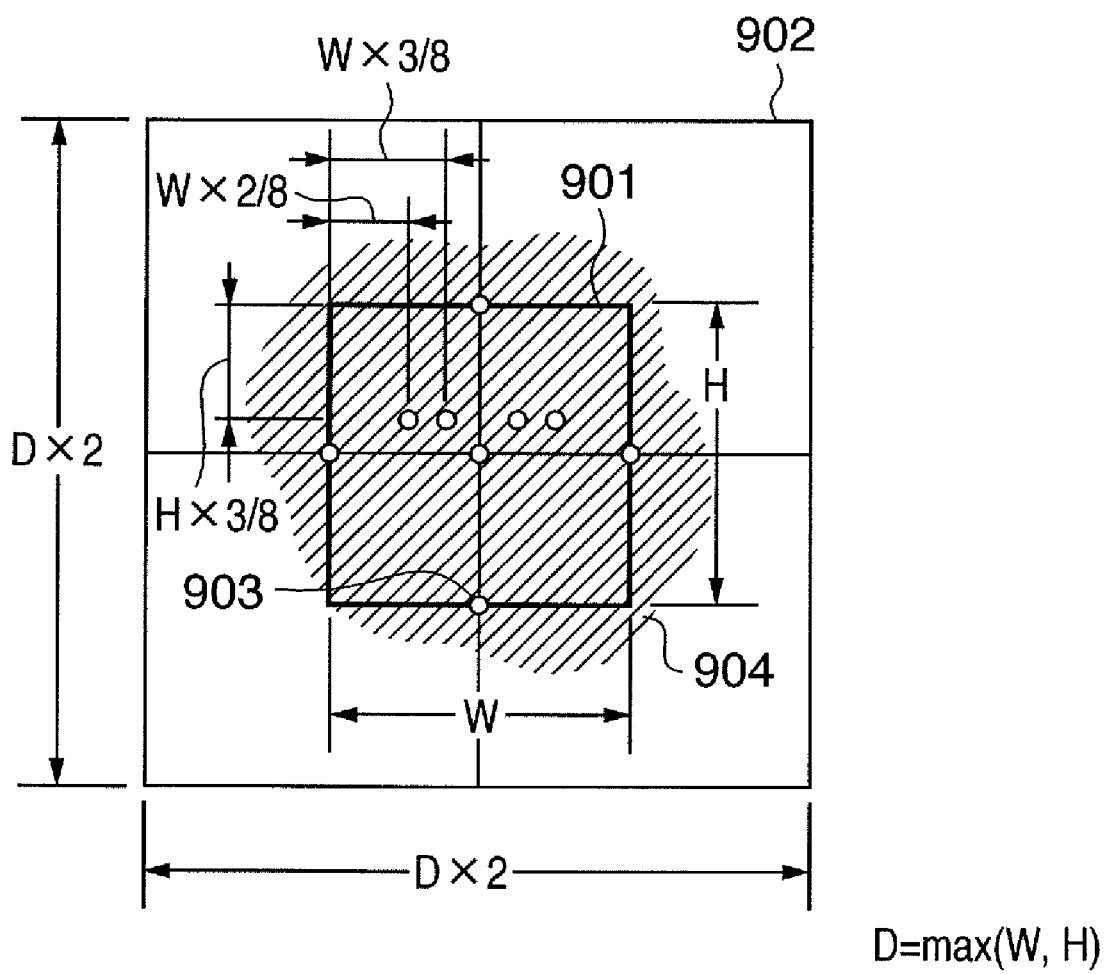
FIG. 9 is a diagram describing an algorithm when carrying out skin color mask generation according to the exemplary embodiment.
Figure 10:
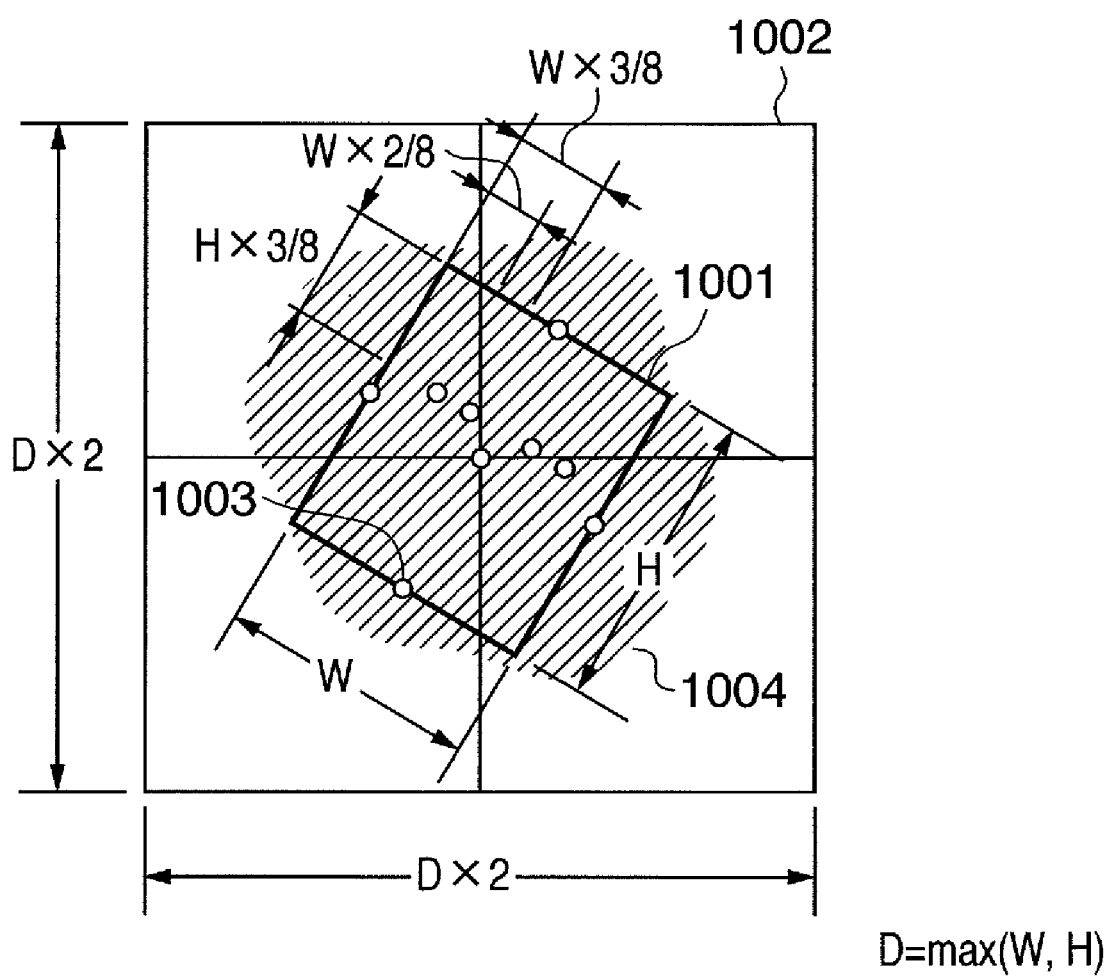
FIG. 10 is a diagram describing an algorithm when carrying out skin color mask generation according to the exemplary embodiment.
Figure 11:
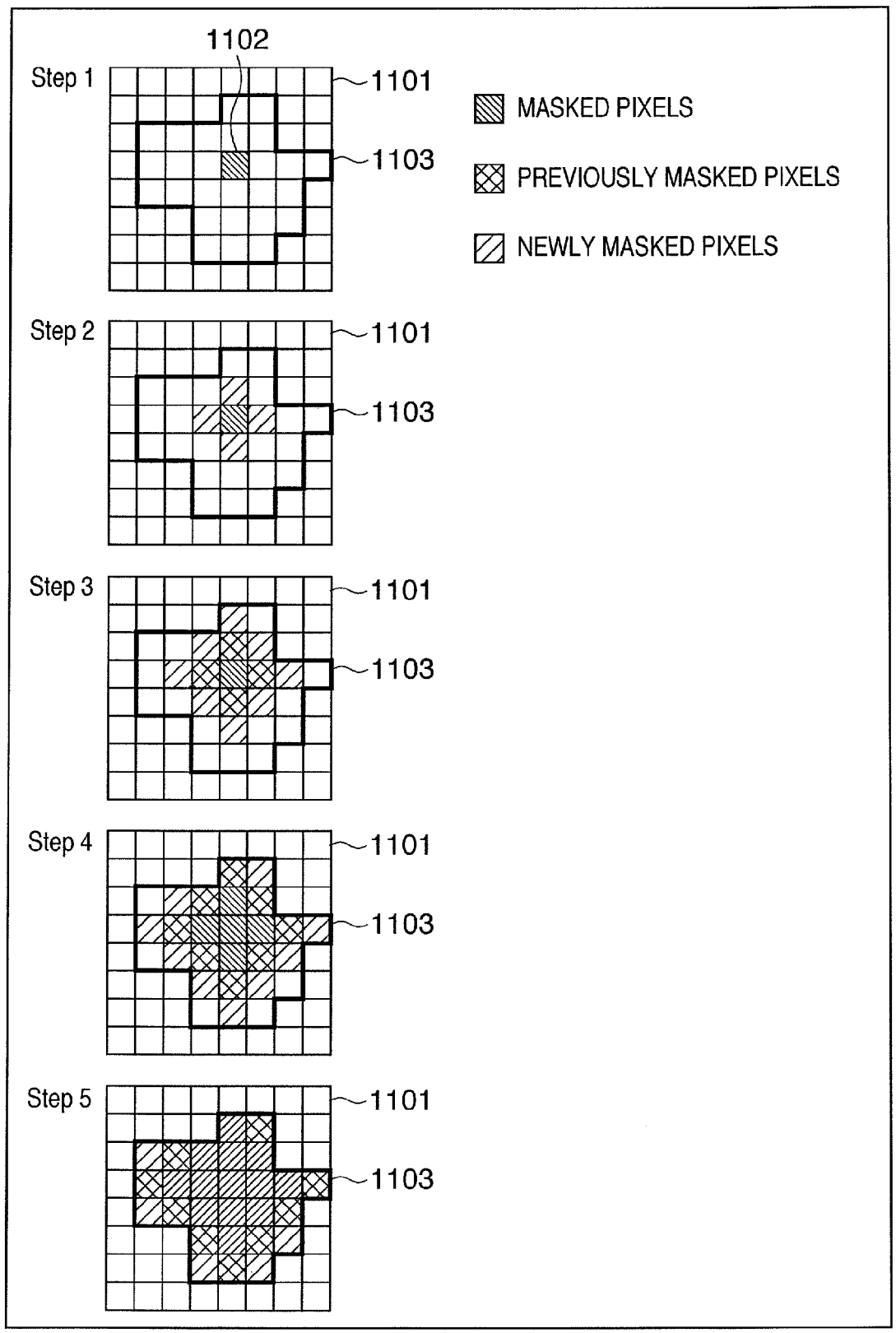
FIG. 11 is a diagram describing an area extension method according to the exemplary embodiment.

The following is a description, with reference to FIG. 9 and FIG. 10, concerning a method for setting an area extension start point in step S202. FIG. 9 illustrates a case in which a face area 901 does not have an inclination, while FIG. 10 illustrates a case in which a face area 1001 has an inclination. In FIG. 9 and FIG. 10, the processing areas 902 and 1002 are set for the face areas 901 and 1001. The processing areas 902 and 1002 are square areas having sides 2×D arranged concentrically to the face areas 901 and 1001. D is a value of the larger of the width W and the height H of the face areas 901 and 1001. According to the present embodiment, even though the face area 1001 has an inclination, the following processes explained referring to FIG. 11 are simplified by setting the processing area 1002 so as to have no inclination.

It should be noted that according to the present embodiment, the area extension start point is determined by the same method in both FIG. 9 and FIG. 10, and therefore, FIG. 9 is used as an example in the following description.

In FIG. 9, area extension start points 903 are set in a plurality of locations, as illustrated by white circles within the face area 901. It should be noted that the start points 903 are, for example, set inside and on an outer periphery of the face area 901.

Various setting methods are conceivable as specific setting methods of the start points, examples of the start points being set only on the center point of the face area 901, or set on the midpoint of each side of the face area 901, or a combination of the two methods. It should be noted that the start points are not limited to the inside and outer periphery of the face area, and may be set at any vicinity of the face area.

When start point coordinates for area extension are determined in this manner, skin color mask generation is carried out in step S203. That is, areas of same skin colors are determined by carrying out area extension based on each start point 903, and skin color masks are generated according to these areas.

The following is a description, with respect to FIG. 11, of an algorithm for area extension according to the present embodiment. FIG. 11 illustrates the processing steps associated with an area extension method according to the present embodiment being applied to image data. In FIG. 11, an image area 1101 comprises 8×8 pixels and pixels surrounded by a thick line 1103 therein having a same attribute. In the present example, the term attribute may refer to hue, saturation, brightness, or another evaluation amount.

An area containing mask data of a uniform size, corresponding to a number of 8×8 pixels in the present example, as the image area 1101 is prepared separately, and all the values in the area are initialized to 0. A start point 1102 is specified in step 1. At the same time, one is stored in a location corresponding to the start point 1102 in the mask data.

In step 2, a determination is made whether the pixels at four points above, below, left, and right of the start point 1102 have an identical attribute, and one is stored in mask data locations corresponding to pixels determined to be identical, as illustrated by diagonal lines in the diagram. Similarly, a determination is made in step 3 concerning pixels determined to have the identical attribute in step 2 whether the pixels at four points above, below, left, and right thereof have the identical attribute, and one is stored in mask data locations corresponding to pixels determined to be identical.

By repeating the above process, pixels in which one is stored, as illustrated in step 4 and step 5, that is, the masked area, are extended, and processing terminates when there is no more area to be extended. As a result, mask data is generated such that a shape that is identical to the pixel group having the identical attribute in the image area 1101 is masked.

According to the present embodiment, specifying a pixel of the skin color as the start point of the area extension in step S202 causes a skin color mask D5 to be generated in step S203. It should be noted that the size of the skin color mask D5 is set to be the same as the processing area 902, and mask data is written as 255, rather than one, according to the present embodiment.

More specifically, in regard to the skin color reference values D4 of the start point that is initially specified, and the surrounding pixels above, below, left, and right of the start point, differences in the respective H, I, and S values thereof are calculated as errors. If the errors are within a predetermined range, 255 is stored in the skin color mask D5 corresponding to the pixel.

By repeating the above process, area extension is brought to completion from all of the start points. It should be noted that area extension is set not to be carried out with regard to pixels outside the processing area 902.

Ideal skin color masks are generated using the foregoing area extension process. However, there are cases when the skin color mask D5 cannot be made to cover the entire face when using only the center point of the face area 901 as the start point for area extension, or the midpoint of each side of the face area 901, or a combination thereof. The reason is that continuity of skin color cannot be maintained, for example, when the face image is a face image wearing glasses, or when shadowing is occurring within the face area 901.

In the case of an image of a face wearing glasses, area extension stops at the rims of the glasses and therefore area extension is not carried out up to areas of skin being covered by the lenses of the glasses. Consequently, no skin color mask is generated for areas of skin coved by the lenses of the glasses.

Consequently, start points are added other than the center point of the face area and points on the outer periphery, according to the present embodiment. For example, as illustrated in FIG. 9, based on the upper left of the face area 901, four points on a line $y=H \times (3/8)$ where $x=W \times (n/8)$ ($n=2, 3, 5$, and 6) are set as start points. The four start points are arranged in the vicinity of the rims of, or inside, the glasses. By setting start points inside the rims of the glasses, area extension can be carried out for areas of skin covered by the lenses of the glasses. By setting start points in the vicinity of the rims of the glasses, skin color masks can also be generated reliably for skin color areas between the glasses.

It should be noted that glasses may be detected from the image such that start points may be set in the vicinity of, or inside, the glasses.

Furthermore, start points that can be added are not limited to the present example, and as long as the points are between the center point and points on the outer periphery of the face area, there is no particular limit to the position or number of the points.

Furthermore, it is possible to further improve the precision of the skin color mask D5 by setting start points on edge points or neighboring points of each organ, as a result of carrying out face organ detection on the face area 901. In the present example, "each organ" refers to eyes, noses, mouths, etc.

Moreover, when the color of a start point set within the face area 901 is not within a predetermined range from the skin color reference value, the start point is determined to be unsuitable. In such cases, the start point is not used, or the unsuitable start point can be eliminated by using a new start point with coordinates of a pixel that is closest in distance to the start point and close to the skin color reference value.

Furthermore, it is also possible for the user to specify the start points. In such a case, a desired skin color can be set as the start point in such ways as using an operation pen to mark suitable skin color portions in the face area on the displayed image.

The skin area 904 detected by area extension based on the start points can include isolated pixels in a vermiculated form. This can result in a problem that the pixels will not be masked. Optimization of the skin color mask D5 is further carried out according to the present embodiment in order to address this problem.

Specifically, removal of isolated points is carried out by performing a smoothing process on the mask information of the skin color mask D5. Data of the skin color mask D5 is searched in sequence, and average values of mask data around the coordinates of interest are calculated. When the mask data of the coordinates of interest is zero, that is, when determined not to be the skin area 904, if the average value of the mask data of peripheral coordinates is greater than or equal to a predetermined threshold, then the average value is stored in the mask data of the coordinates of interest.

In obtaining an average value of the peripheral area of the coordinates of interest, the range for the peripheral area may not particularly need to be set. It would be permissible to employ a value that is calculated from the size of the face area 901. For example, D/c calculated using a constant c to prescribe a ratio of the size D to W of the face area 901 may be employed as the size of the peripheral area. By setting the size of the peripheral area in such a manner, removal of isolated points can be carried out in response to the size of the face area 901, as a result of smoothing.

Furthermore, the method for area extension according to the present embodiment is not limited to the example illustrated in FIG. 11, and other image clustering techniques may be used as the method for detecting the skin area 904. For example, image clustering based on a smallest binary tree method may be used.

Figure 12:
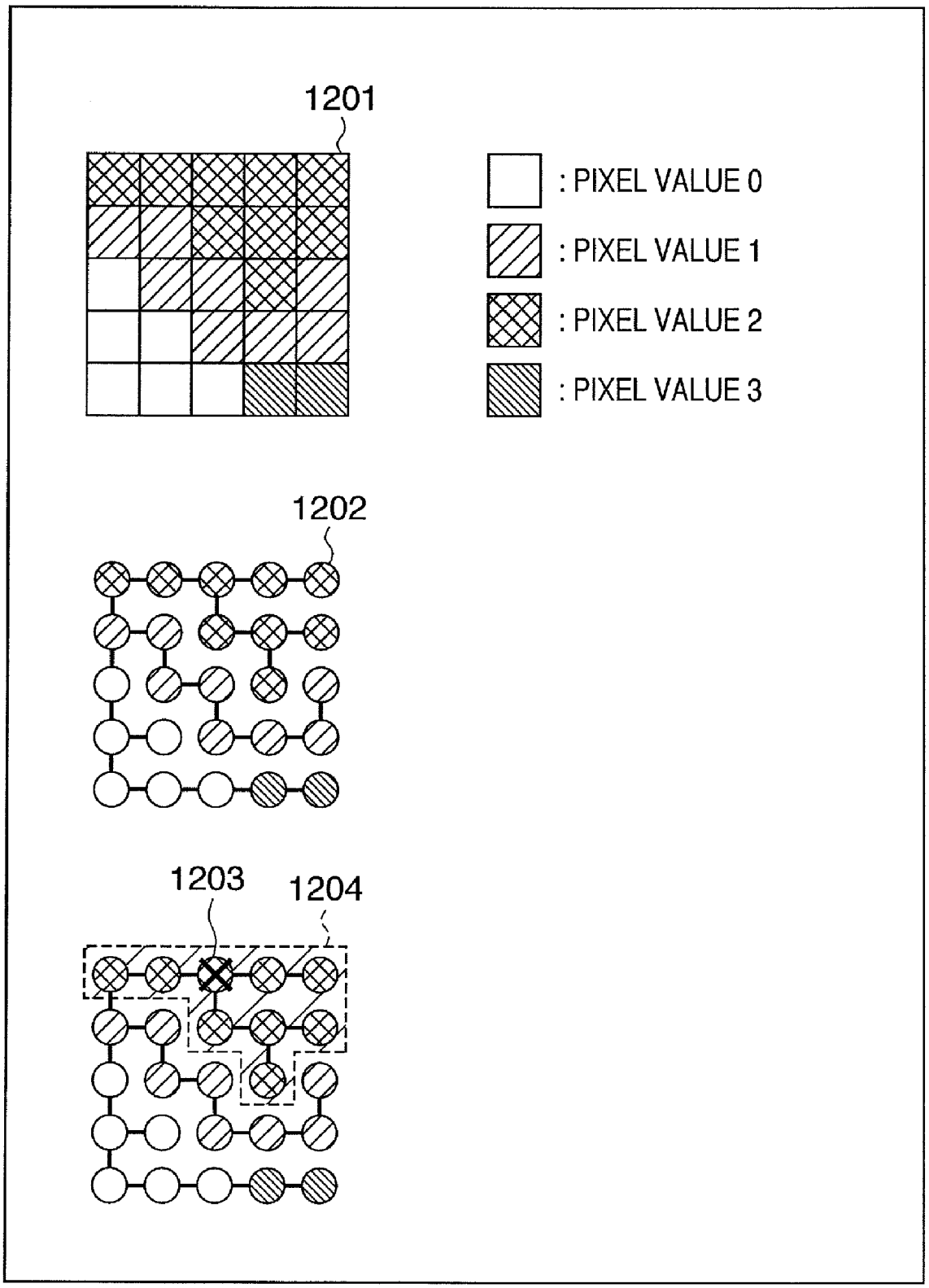
FIG. 12 is a diagram describing image dividing based on a smallest binary tree method according to the exemplary embodiment.

The following is a description, with reference to FIG. 12, of an area extension based on the smallest binary tree method. In FIG. 12, image data 1201 targeted comprises 5×5 pixels, where each pixel has a value between 0 and 3 inclusive. When the image data 1201 is expressed as a smallest binary tree, the linking of the entire image is expressed as illustrated by a numeral 1202 by linking pixels having the same value, and, moreover, by joining the linked pixels to the linkage of pixels of different values in one location only. By using a smallest binary tree expression 1202, it is possible to conduct a simple search of a pixel collection 1204 having identical values from a pixel 1203 set as the start point, for example. According to the present embodiment, the skin area 904 can thus be obtained by using a principle of the smallest binary tree method, as in the area extension method illustrated in FIG. 11.

As described above, the skin color mask D5 according to the present embodiment is generated as a mask indicating a suitable correction range, taking the continuity of skin color into consideration.

According to the present embodiment, an ellipse mask D6 is generated in step S204 in parallel to the generation of the skin color mask. The ellipse mask D6 according to the present embodiment is generated to keep the image correction area within a range of a predetermined distance from the face area. The following is a description concerning a method for generating the ellipse mask D6, with reference to FIGS. 13 and 14.

Figure 13:
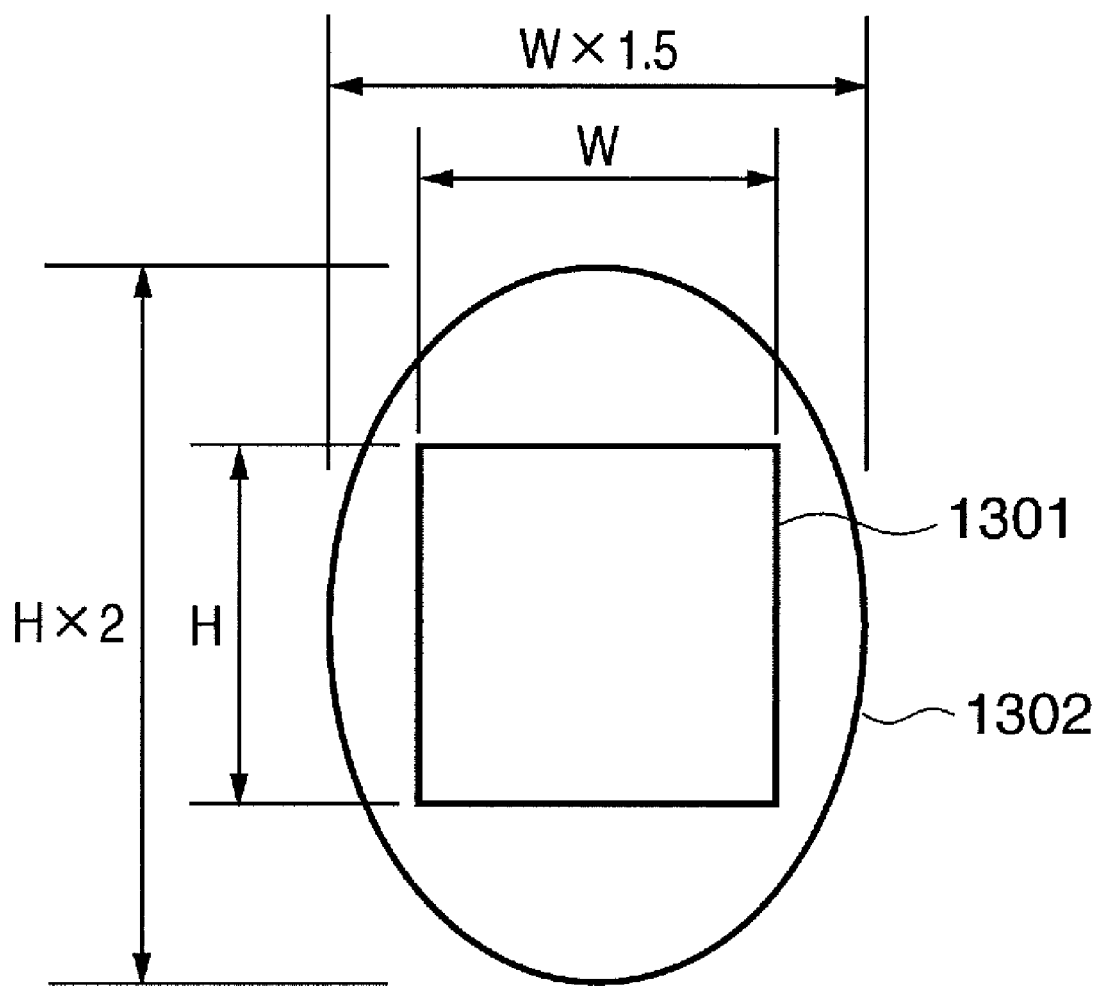
FIG. 13 illustrates a relationship between an ellipse mask and a face detection area according to the exemplary embodiment.

FIG. 13 is a diagram describing a method in which an ellipse area is set for the face area. An ellipse area 1302, having a major axis of H×2 and a minor axis of W×1.5, is set for the width W and height H of a face area 1301. It should be noted that the values for the major axis and the minor axis are not limited to this example, and it is sufficient for the values to be of a size accommodating the face area. The ellipse area 1302 becomes the ellipse mask D6, and each value is set such that 255 is stored in a center portion, and other values approach zero toward a peripheral area of the ellipse as one moves further from the center, with regard to mask values in the area. It should be noted that values of the ellipse mask D6 in arbitrary points within the ellipse area 1302 are not limited to the example, and it is sufficient for the values to be set so as to become smaller for larger distances from the center of the ellipse area 1302.

Figure 14:
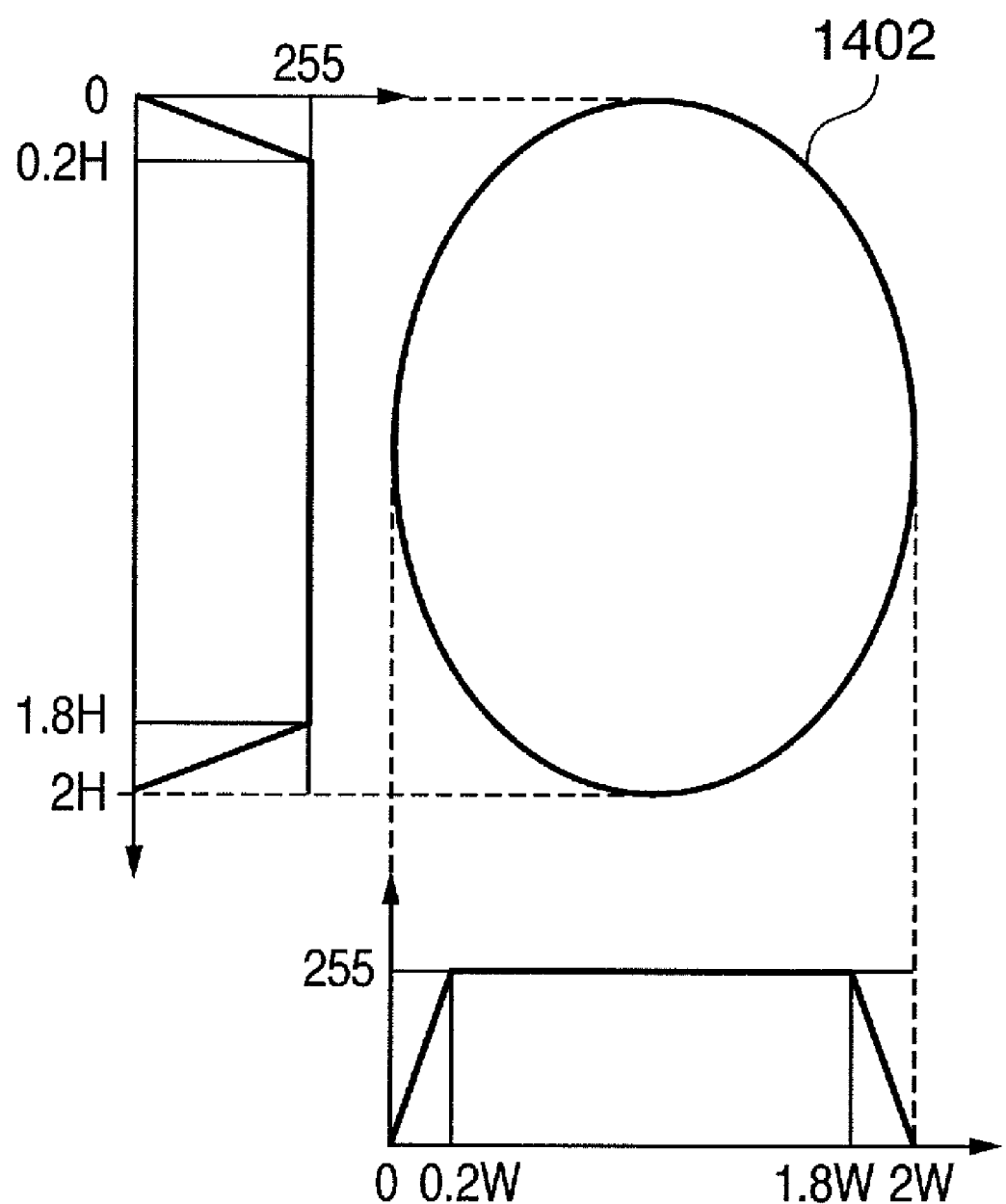
FIG. 14 illustrates change in weighted values in an ellipse mask according to the exemplary embodiment.

FIG. 14 illustrates an example in which mask values are set within an ellipse area 1402. Specifically, an example is illustrated in which the values of the ellipse mask D6 are set to 255 in an area of a distance from the center up to 80% of the radius, and in the area beyond 80% of the radius, the values of the ellipse mask D6 undergo monotone reduction, so as to become zero at the perimeter of the ellipse. The ellipse area 1402 illustrated in FIG. 14 is the same as the ellipse area 1302 illustrated in FIG. 13. The graphs below and to the left of the ellipse area 1402 show mask values at cross-sections on the major axis and the minor axis of the ellipse area 1402, respectively. Accordingly, the values of the ellipse mask D6 are increased from 0 to 255 across a range from 0 to 0.2 H, based on an upper end of the major axis of the ellipse area 1402. Over the range continuing from 0.2 H to 1.8 H, the values of the ellipse mask D6 are constant at 255. Over the final range from 1.8 H to 2 H, the values of the ellipse mask D6 are reduced from 255 to 0. Similarly, with regard to the minor axis direction, based on the left end thereof, the values of the ellipse mask D6 are set to increase from 0 to 255 for 0 to 0.2 W, to be 255 for 0.2 W to 1.8 W, and to decrease from 255 to 0 from 1.8 W to 2.0 W.

Thus, the ellipse mask D6 according to the present embodiment is generated as a mask that is weighted according to the distance from the center of the face.

The skin color mask D5 that is generated in step S203, and the ellipse mask D6 is generated in step S204, are composed in step S205 to obtain the composition mask D7. A composition method involves, for example, comparing the mask data values for each pixel internal to the processing area 902 at the time of generating the skin color mask D5 illustrated in FIG. 9, and the ellipse area 1302 at the time of generating the ellipse mask D6 illustrated in FIG. 13, and setting the smaller value of the two as a value of the composition mask D7.

Since the composition mask D7 is obtained by composing the skin color mask D5, which gives consideration to continuity of skin color, and the ellipse mask D6, which gives consideration to distance from the face center, the composition mask D7 is used as data for controlling the weighting of correction values that give consideration to the continuity of skin color and distance. The composition mask D7 is thus outputted as a mask generated in step S104, and is used in the image correction processing of step S105. According to the present embodiment, by carrying out correction using the composition mask D7, correction is not conducted outside the range indicated by the ellipse mask D6, even when the background of the face area expresses a similar color to the face area, that is, a flesh-tone related color.

The following is a description of the image correction processing in step S105. In step S105, corrected image data D3 is generated, with consideration given to the continuity of skin color and the distance from the face center, by carrying out image correction based on the composition mask D7.

Generally, for images in which the main photographic object is the human face, improvements in picture quality can be achieved by blurring facial skin areas. A moving average filtering process or a weighted average filtering process or the like can be used as the blurring process, and the composition mask D7 can be used in controlling the amounts of blurring in the filtering process.

Figure 15:
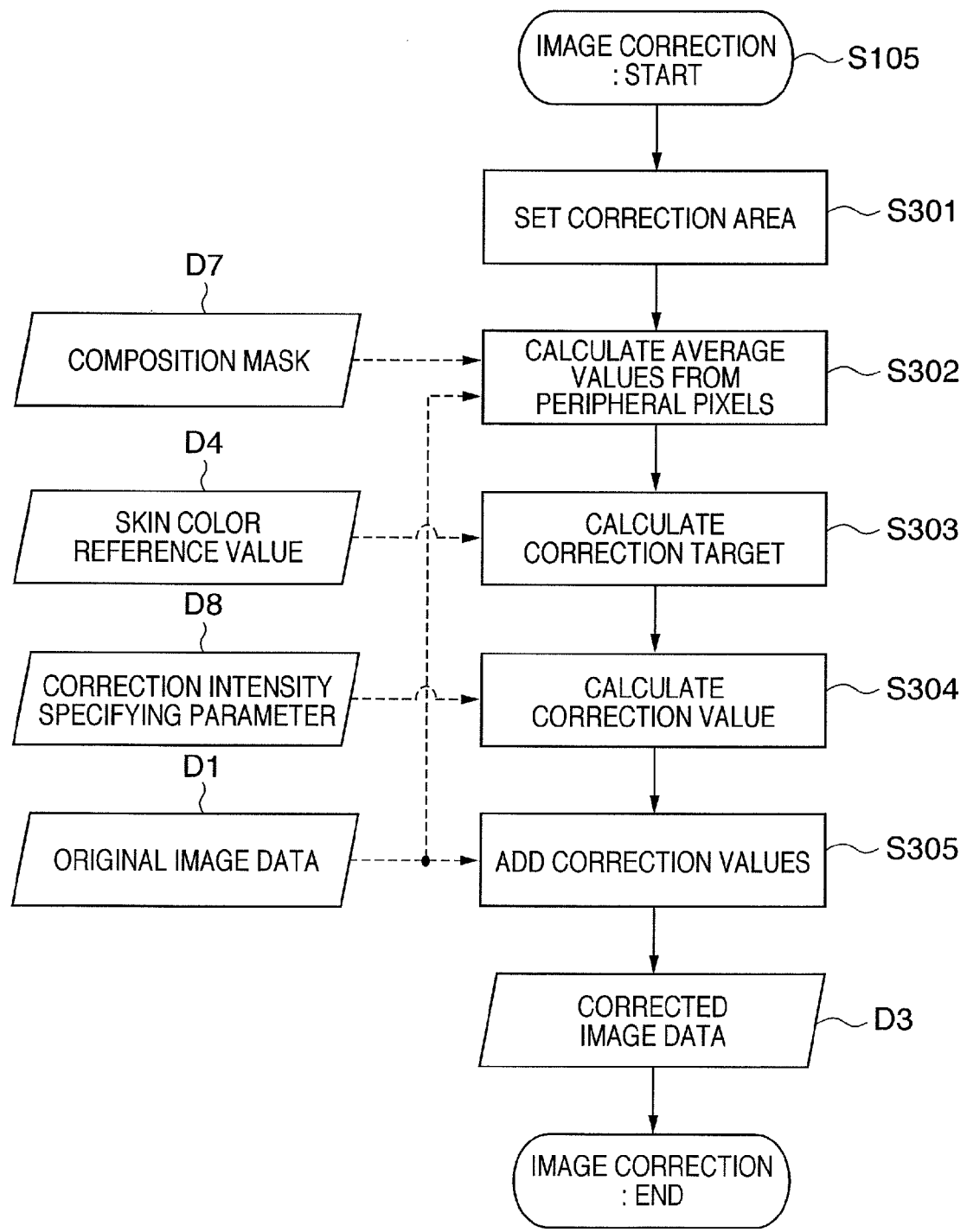
FIG. 15 is a flowchart illustrating an image correction processing according to the exemplary embodiment.

FIG. 15 is a flowchart illustrating one example of an image correction process in step S105. In step S301, a correction area is set. Similar to the processing area 902 of FIG. 9, the correction area is set as an area twice the size of the face for the detected face coordinates. Namely, the correction area (x, y) is in a range of 0≦x<2D, 0≦y<2D.

In step S302, an average value of peripheral pixels in the predetermined range is calculated for the pixels of interest in the correction area. The range of peripheral pixels is determined based on a size of the face area 901, for example, D. It is assumed that the range of peripheral pixels is D/e, where e is a constant, and the average values Rave, Gave, and Bave are calculated for R, G, and B, respectively, and a formula for calculating R is shown below. It should be noted that R (x, y) in the formula below indicates the components R of the coordinates (x, y):

$$R_{ave} = \frac{1}{4\left(\frac{D}{e}\right)^2} \sum_{Y=y-\frac{D}{e}}^{y+\frac{D}{e}} \sum_{X=x-\frac{D}{e}}^{x+\frac{D}{e}} R(x, y)$$ (Numerical expression 2)

In step S303, correction target values Rtar, Gtar, and Btar are calculated for the pixel of interest. A calculation formula for R is as illustrated below:

$$R\text{tar} = D4(x, y) \times q + R\text{ave} \times (1-q)$$ (6)

Note that D4 (x, y) is the skin color reference value of the coordinates (x, y) generated in step S201, and q is an appropriate percentage set in a range of 0≦q≦1.

In step S304, correction values Rcor, Gcor, and Bcor are calculated for the pixel of interest, using the correction intensity specifying parameter D8 stored in step S101. A calculation formula for R is illustrated below:

$$R_{cor} = \frac{(R_{tar}(x, y) - R(x, y)) \times D7(x, y)}{D8}$$ (Numerical expression 3)

Note that D7 (x, y) has the values of coordinates (x, y) in the composition mask D7 generated in step S205. Furthermore, the correction intensity specifying parameter D8 is a value indicating the correction intensity that is specified by the user, and has been adjusted in advance in response to corrected picture quality.

In step S305, the correction values Rcor, Gcor, and Bcor, that were calculated in step S304, are added to the R, G, and B components of the original image data. The upper limit values and the lower limit values are adjusted so that the values of R, G, and B after adding are within the range of 0 to 255.

Figure 16:
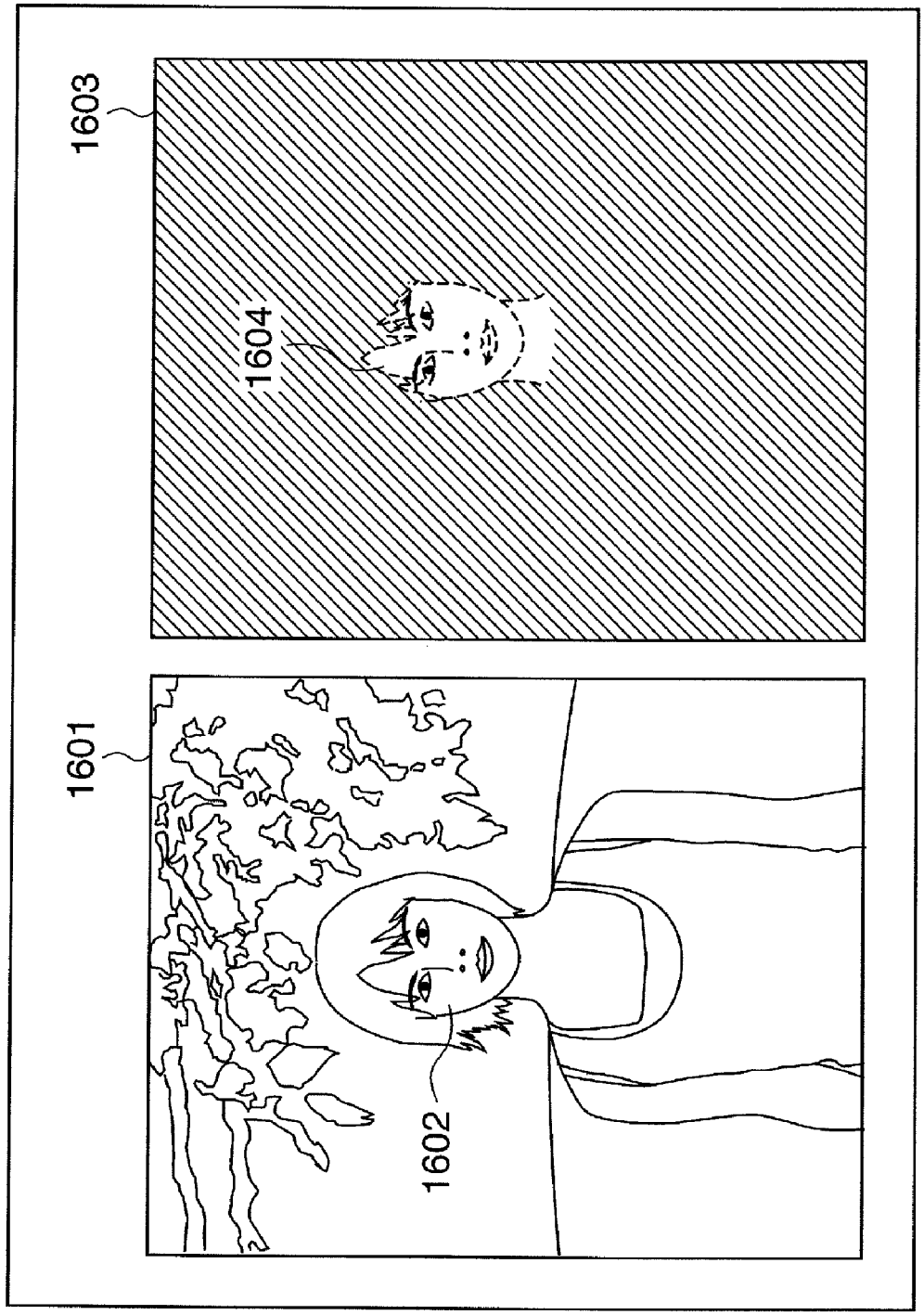
FIG. 16 illustrates one example of an image correction result according to the exemplary embodiment.

An example of a result of image correction according to the present embodiment is illustrated in FIG. 16, wherein the human image on the left is an original image 1601 in which is present a face area 1602. An image 1603 on the right side of this diagram is an image in which a correction area 1604 is illustrated with respect to the original image 1601. According to FIG. 16, the correction area 1604 is substantially matched to the face area 1602 in the original image 1601.

According to the present embodiment, distributions of skin color pixels can be accurately obtained for face areas contained in images, and, therefore, it becomes possible to automatically set a suitable correction range that takes continuity of skin color into consideration, as well as to carry out suitable correction.

Figure 17:
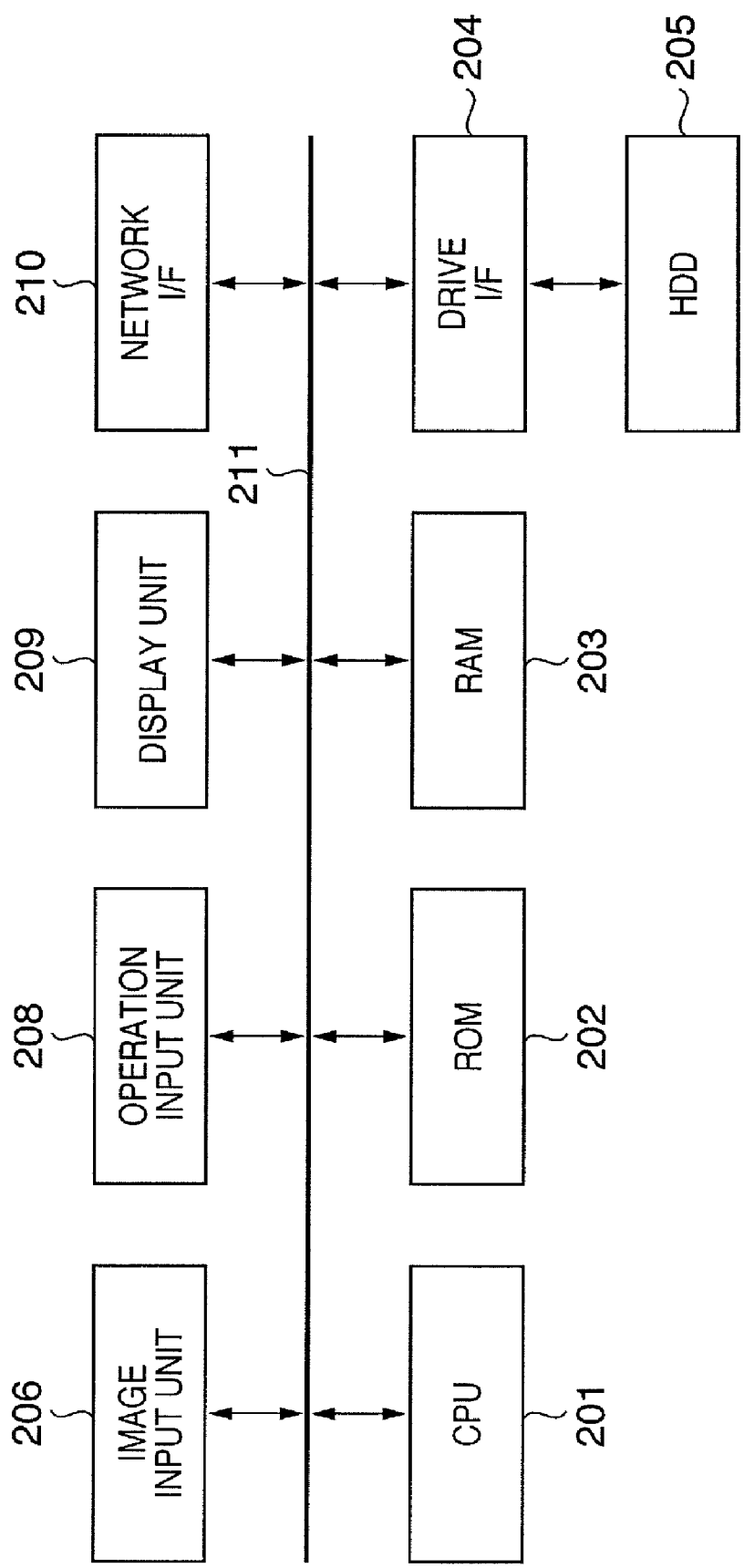
FIG. 17 is a block diagram illustrating a basic configuration of a computer in which the embodiment is mounted.

The following is a description of a hardware configuration that achieves the present embodiment. FIG. 17 is a block diagram illustrating a basic configuration of a computer in which image correction processing according to the present embodiment is executed. The image processing apparatus according to the present embodiment is installed as an application that runs on the computer.

In the configuration illustrated in FIG. 17, numeral 201 indicates a CPU that executes commands according to a program stored in a ROM 202 and a RAM 203. Numeral 202 indicates a ROM that stores programs and data necessary for the program and other control for achieving operation of the present embodiment and numeral 203 indicates a RAM that is used as a work area for temporarily storing data. Numeral 204 indicates a drive interface that achieves an interface between the computer and an external storage device such as IDE or SCSI, and numeral 205 indicates a hard drive that is a storage device that stores various types of data such as images and feature quantities thereof, as well as control programs, etc.

Numeral 206 indicates an image input unit for inputting images from devices such as digital cameras and scanners and the like, and numeral 208 indicates an operation input unit that receives input from an operator via a keyboard and a mouse or the like. Numeral 209 indicates a display unit such as a CRT or a liquid crystal display, and numeral 210 indicates a network interface, such as a modem or a LAN, for carrying out connection to a network such as the Internet or an intranet. Numeral 211 indicates a bus, which connects each unit of the configuration, and enables data input-output there between.

While a detailed description has been given according to the present embodiment, the present invention is also achievable in embodiments such as a system, an apparatus, a method, a program, or a storage medium or recording medium. Specifically, it may also be applied to a system constituted by multiple devices, such as a host computer, an interface device, a capture device, and a Web application, and may also be applied to an apparatus constituted by a single device.

It should be noted that the present invention may also be accomplished by supplying a software program that achieves the functions of the embodiment directly or remotely to a system or a device, and having a computer of the system or device read out and execute the supplied program code. It should be noted that "program" in this case refers to a program corresponding to flowcharts illustrated in the diagrams pertaining to the present embodiment.

Consequently, the actual program code to be installed on a computer to achieve the functional processing of the present invention on the computer also achieves the present invention. That is, the present invention also includes an actual computer program for achieving the functional processing of the present invention.

In such a circumstance, the program may take any form and may be object code, a program to be executed by an interpreter, or script data supplied to an OS, provided that it has the functionality of the program.

Recording media for supplying the program include the media shown below, such as floppy disks, hard disks, optical disks, magneto-optical disks, MO, CD-ROM, CR-R, CR-RW, magnetic tape, nonvolatile memory cards, ROM, DVD (DVD-ROM, DVD-R), etc.

An actual computer program, or a compressed file containing an automatic installation function, of the present invention may be downloaded onto a recording medium, such as a hard disk, that is connected to an Internet website via a browser on a client computer. Furthermore, it is also possible to achieve the present invention by having the program code that constitutes the program of the present invention divided into a plurality of files and downloading the respective files from different websites. That is, a World Wide Web server that enables a plurality of users to download the program files for achieving the functional processing of the present invention on a computer is also included within the present invention.

Furthermore, it is also possible to encode the program of the present invention for storage on a recording medium such as a CD-ROM, which is then distributed to users, and users who satisfy a predetermined condition are allowed to download, from a website, via the Internet, information of a key that unlocks the encoding. That is to say, users who execute the encoded program by using the key information are able to install the program on a computer.

Furthermore, the functionality according to the embodiment is achieved by having a computer execute the program that has been read out. Moreover, an OS or the like that runs on a computer may carry out all or part of the actual processing according to instructions of the program such that the functionality of each of the embodiment is achieved by the processing thereof.

Additionally, the program that is read out from the recording medium may be written to a memory provided in an extension board inserted into the computer, or an extension unit connected to the computer, whereupon the functionality of the embodiment can be achieved by executing the program. That is, it is possible that a CPU or the like provided in the extension board or extension unit may carry out all or part of the actual processing according to instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-147350, filed May 26, 2006, which is hereby incorporated by reference herein in its entirety.

What is claimed is:

1. A method for processing an image to detect a skin area of a person in the image, the method comprising:
   detecting a face area of the person in the image;
   calculating a skin color reference value based on at least one pixel in the detected face area;
   setting at least one pixel in a vicinity of an area extension blocking area of the detected face area of the person as a start point so that area extension processing is applied in the vicinity of the area extension blocking area; and
   detecting a skin area of the person in the image by searching for successive pixels having skin color from the set start point and extending the skin area,
   wherein, in a case where a color of the set start point is not within a predetermined range from the skin color reference value, the set start point is not used as the start point of the area extension processing.

2. The method according to claim 1,
wherein the area extension blocking area is an area in the image corresponding to at least one of a rim of glasses, eye, nose and mouth.

3. The method according to claim 1, further comprising: detecting glasses in the face area of the image,
wherein the setting comprises setting a plurality of pixels in a vicinity of or inside the detected glasses as start points.

4. The method according to claim 1,
wherein the detecting of the skin area comprises extending the pixels having skin color based on the skin color reference value from the start points.

5. The method according to claim 1, further comprising:
setting an ellipse area for the image;
generating a composition mask by combining a skin color mask determined based on a result of the area extension processing and an ellipse mask determined based on the ellipse area; and
performing image correction processing for the skin area of the person in the image by using the composition mask.

6. The method according to claim 5, wherein the skin color mask is generated using a smallest binary tree method.

7. The method according to claim 1, wherein calculating the skin color reference value further comprises:
calculating an average value of skin color pixels in the face area as the skin color reference value.

8. The method according to claim 7, wherein, the face area is divided into a plurality of areas, and the skin color reference value is calculated based on an average value of skin color pixels for each area obtained by the dividing.

9. The method according to claim 8, wherein, the face area is divided into top-bottom and left-right semicircles.

10. The method according to claim 8, wherein the face area is divided into top-bottom-left-right sector regions.

11. The method according to claim 1,
wherein, in setting the start point, a point of a predetermined position in the face area is set as the start point.

12. The method according to claim 11,
wherein the predetermined position includes a center point and a peripheral point in the face area.

13. The method according to claim 11,
wherein the predetermined position includes a point between a center and an outer periphery in the face area.

14. The method according to claim 11,
wherein, in a case where color of the predetermined position is not a skin color, the predetermined position is moved and the moved position is set as the start point.

15. The method according to claim 1, further comprising: performing a blurring process on the detected skin area.

16. The method according to claim 1, further comprising: setting a correction intensity parameter indicating a degree of correction, and
wherein, a degree of image correction processing for the correction area is adjusted based on the correction intensity parameter.

17. The method according to claim 1,
wherein the face area is a rectangular area.

18. A non-transitory computer-readable storage medium storing a computer-executable program, the computer-executable program causing a computer to execute the method of claim 1.

19. An image processing apparatus to detect a skin area of a person in an image, the image processing apparatus comprising:
a processor including a correction area decision unit configured to detect a face area of the person in the image, calculate a skin color reference value based on at least one pixel in the detected face area, and set at least one pixel in a vicinity of an area extension blocking area of the detected face area of the person as a start point that area extension processing is applied in the vicinity of the area extension blocking area, and a detection unit configured to detect a skin area of the person in the image by searching for successive pixels having skin color from the set start point and extending in the skin area,
wherein, in a case where a color of the set start point is not within a predetermined range from the skin color reference value, the set start point is not used as the start point of the area extension processing.

20. The image processing apparatus according to claim 19,
wherein the area extension blocking area is an area in the image corresponding to at least one of a rim of glasses, eye, nose and mouth.

21. The image processing apparatus according to claim 19,
wherein the correction area decision unit is further configured to detect glasses in the face area of the image,
wherein the setting comprises setting a plurality of pixels in a vicinity of or inside the detected glasses as start points.

22. The image processing apparatus according to claim 19,
wherein the detection unit is configured to detect the skin area by extending the pixels having skin color based on the skin color reference value from the start point.

23. The image processing apparatus according to claim 19,
wherein the correction area decision unit is further configured to:
set an ellipse area for the image;
generate a composition mask by combining a skin color mask determined based on a result of the area extension processing and a ellipse mask determined based on the ellipse area; and
perform image correction processing for the skin area of the person in the image by using the composition mask.

24. The method according to claim 1, wherein the skin area is detected by using four start points on a horizontal line defined in the detected face area.

25. The method according to claim 24, wherein the horizontal line is set at a vertical position in the vicinity of $3/8$ of the total height from the top of the detected face area, and the four start points along the horizontal line are set in the vicinity of $2/8$, $3/8$, $5/8$ and $6/8$ of the total width of the detected face area.

26. The method according to claim 1, wherein the start point is set on a line within the face area.

27. The method according to claim 1, wherein the skin area is detected by using a plurality of start points.

* * * * *